(12) United States Patent
Cranor

(10) Patent No.: US 7,052,631 B2
(45) Date of Patent: May 30, 2006

(54) DEGRADABLE CHEMILUMINESCENT PROCESS AND PRODUCT

(75) Inventor: Earl Cranor, Longmeadow, MA (US)

(73) Assignee: Cyalume Technologies, Inc., West Springfield, MA (US)

( * ) Notice: Subject to any disclaimer, the term of this patent is extended or adjusted under 35 U.S.C. 154(b) by 540 days.

(21) Appl. No.: 10/010,075

(22) Filed: Nov. 13, 2001

(65) Prior Publication Data

US 2003/0102467 A1    Jun. 5, 2003

(51) Int. Cl.
C09K 11/00    (2006.01)
C09K 3/00    (2006.01)
F21K 2/00    (2006.01)

(52) U.S. Cl. .................. 252/700; 362/34; 43/17.6
(58) Field of Classification Search ........... 252/700; 362/34; 43/17.6
See application file for complete search history.

(56) References Cited

U.S. PATENT DOCUMENTS

| | | | | |
|---|---|---|---|---|
| 3,671,450 | A | | 6/1972 | Rauhut et al. ............ 252/700 |
| 5,067,051 | A | * | 11/1991 | Ladyjensky ................ 362/34 |
| 5,158,349 | A | * | 10/1992 | Holland et al. ............ 252/700 |
| 5,346,929 | A | | 9/1994 | Guttag ...................... 523/124 |
| 5,370,828 | A | * | 12/1994 | Ladyjensky ............... 252/700 |
| 5,409,751 | A | * | 4/1995 | Suzuki et al. ............ 428/36.9 |
| 5,462,983 | A | * | 10/1995 | Bloembergen et al. ...... 524/51 |
| 5,597,517 | A | * | 1/1997 | Chopdekar et al. ........ 252/700 |
| 5,759,569 | A | | 6/1998 | Hird et al. ................. 424/443 |
| 5,760,118 | A | | 6/1998 | Sinclair et al. ............ 524/306 |
| 5,869,647 | A | * | 2/1999 | Narayan et al. ............ 536/107 |
| 5,980,055 | A | | 11/1999 | Palmer et al. .............. 362/34 |

FOREIGN PATENT DOCUMENTS

| | | |
|---|---|---|
| EP | 0 406 551 | 1/1991 |
| EP | 0 562 528 | 9/1993 |
| WO | WO 96/21475 | 7/1996 |

OTHER PUBLICATIONS

Online Article, Garbassi and Po, Engineering Thermoplastics Overview, Encyclopedia of Polymer Science and Technology, http://www.mrw.interscience.wiley.com/epst/articles/pst406/sect1-fs.html , pp. 1-4, Posting Date Oct. 2001.*
Online Article, Xanthos and Todd, Plastics Processing, Kirk-Othmer Encyclopedia of Chemical Technology, http://www.mrw.interscience.wiley.com/kirk/articles/plasxant.a01/sect2-fs.html , pp. 1-3, Posting Date Nov. 2003.*
PCT search report corresponding to PCT/US02/36688, pp. 1-6, European Patent Office, Rijswijk, NL, Mail Date Mar. 28, 2003.*
Park, et al., Viscoelasticity of biodegradable polymer blends of poly (3-hydroxybutyrate) and poly(ethylene oxide), (2001) vol. 42, No. 13, pp. 5737-5742, month unknown.
Tighe, et al., "Novel Biodegradable Ester-Based Polymer Blends", (1997) vol. 123, pp. 133-145, month unknown.

* cited by examiner

Primary Examiner—Daniel S. Metzmaier
(74) Attorney, Agent, or Firm—McHale & Slavin PA

(57) ABSTRACT

The present invention teaches a chemiluminescent device along with a process for its production. The invention specifically relates to a chemiluminescent article of manufacture which includes a containment device and chemical system, both of which may be selected so as to be particularly susceptible to environmental degradation subsequent to their use. In a preferred embodiment the chemiluminescent device is categorized as being biodegradable, i.e. designed to be capable of losing its physical form and re-entering the environment.

11 Claims, No Drawings

DEGRADABLE CHEMILUMINESCENT PROCESS AND PRODUCT

FIELD OF THE INVENTION

This invention relates to chemiluminescent processes and products; particularly to a chemiluminescent article of manufacture and chemical system which are biodegradable subsequent to their use; and most particularly to a product capable of losing its physical form and re-entering the environment.

BACKGROUND OF THE INVENTION

Chemiluminescense relates to the production of visible light attributable to a chemical reaction. The important aqueous chemiluminescence substances luminal and lucigenin were discovered in 1928 and 1935, respectively. A series of organic soluble chemiluminescent materials were developed in the early 1960's based on a study of the luminescent reactions of a number of organic compounds. A typical organic system useful for chemiluminescence was disclosed by Bollyky et al., U.S. Pat. No. 3,597,362 and claimed to exhibit a quantum efficiency of about 23% compared with about 3% for the best known aqueous systems.

In its most basic form the two-component, liquid phase oxalate ester chemical light system must comprise an "oxalate component" comprising an oxalic acid ester and a solvent, and a "peroxide component" comprising hydrogen peroxide and a solvent or mixture of solvents. In addition, an efficient fluorescer must be contained in one of the components. An efficient catalyst, necessary for maximizing intensity and lifetime control, may be contained in one of the components.

The oxalate component provides an oxalate ester-solvent combination which permits suitable ester solubility and storage stability. The peroxide component provides a hydrogen peroxide-solvent combination which permits suitable hydrogen peroxide solubility and storage stability.

The solvents of the two components may be different but must be miscible. At least one solvent solubilizes the efficient fluorescer and at least one of the solvents solubilizes the efficient catalyst.

Typical suitable fluorescent compounds for use in the present invention are those which have spectral emission falling between about 300 and 1200 nanometers and which are at least partially soluble in the diluent employed. Among these are the conjugated polycyclic aromatic compounds having at least 3 fused rings, such as: anthracene, substituted anthracene, benzanthracene, substituted benzanthracene, phenanthrene, substituted phenanthrene, naphthacene, substituted naphthacene, naphthalene, substituted naphthalene, pentacene, substituted pentacene, perylene, substituted perylene, violanthrone, substituted violanthrone, and the like. Typical substituents for all of these are phenyl, alkyl ($C_1$–$C_{16}$), chloro, bromo, cyano, alkoxy ($C_1$–$C_{16}$), and other like substituents which do not interfere with the light generating reaction contemplated herein.

The preferred fluorescers are 9,10-bis(phenylethynyl) anthracene, 1-methoxy-9,10-bis(phenylethynyl) anthracene, perylene, rubrene, mono and dichloro substituted 9,10-bis (phenylethynyl) anthracene, 5,12-bis(phenylethynyl) tetracene, 9,10-diphenyl anthracene, and 16,17-didecycloxy-violanthrone.

The term "peroxide component," as used herein, means a solution of a hydrogen peroxide compound, a hydroperoxide compound, or a peroxide compound in a suitable diluent.

The term "hydrogen peroxide compound" includes (1) hydrogen peroxide and (2) hydrogen peroxide producing compounds.

Hydrogen peroxide is the preferred hydroperoxide and may be employed as a solution of hydrogen peroxide in a solvent or as an anhydrous hydrogen peroxide compound such as sodium perborate, sodium peroxide, and the like. Whenever hydrogen peroxide is contemplated to be employed, any suitable compound may be substituted which will produce hydrogen peroxide. The hydrogen peroxide concentration in the peroxide component may range from about 0.2M to about 15M. Preferably, the concentration ranges from about 1M to about 2M.

The lifetime and intensity of the chemiluminescent light emitted can be regulated by the use of certain regulators such as:

1) by the addition of a catalyst which changes the rate of reaction of hydroperoxide. Catalysts which accomplish that objective include those described in M. L. Bender, "Chem. Revs.," Vol. 60, p.53 (1960). Also, catalysts which alter the rate of reaction or the rate of chemiluminescence include, but are not limited to those accelerators of U.S. Pat. No. 3,775,366, and decelerators of U.S. Pat. Nos. 3,691,085 and 3,704,231, or 2) by the variation of hydroperoxide; wherein both the type and concentration of hydroperoxide are critical for the purposes of regulation.

Of those catalysts known to be useful, sodium salicylate and various tetraalkylammonium salicylates have been most widely used. Lithium carboxylic acid salts, especially lithium salicylate, lithium 2-chlorobenzoate, and lithium 5-t-butyl salicylate are excellent catalysts for low temperature systems.

As outlined above, chemical light is produced by mixing an oxalate ester and hydrogen peroxide together in the presence of a catalyst and a fluorescer. Typically, the oxalate ester and fluorescer are dissolved in one solvent. The hydrogen peroxide and catalyst are dissolved in another. The typical chemical light device is a polyethylene or polypropylene container with the two liquids inside, separated until light is needed, for example, by packaging one of the liquids in a sealed glass vial and floating the vial in the second liquid. Light is generated when the end user flexes the plastic outer container, fracturing the glass vial or alternatively by destroying the integrity of a separating member, e.g. a diaphragm or membrane, in any suitable manner thereby allowing the two liquids to mix.

Chemical light devices are practically non-biodegradable due to the plastic utilized in their construction. Polyolefins will exist for hundreds of years in the normal environment without losing a significant portion of their physical properties. This fact has created problems and concerns in all chemical light devices markets, but especially in the military and commercial fishing markets. Additionally, the liquids inside these devices are not designed for general release into the environment. The commercially practiced solvent systems are, in fact, considered marine pollutants in many parts of the world.

Worldwide, over fifty million devices per year are consumed between the military and commercial fishing markets. This volume of consumption and the manner of the consumption is creating a waste and waste disposal problem. The permanence of the plastic container making up the chemical light devices contributes to this waste and waste disposal problem.

Military use of chemical light devices includes providing basic light (illumination), safety marking, covert marking, and as training aids. The uses often involve wide dispersion of multiple chemical light devices over large surface areas of land (many acres). After use, evidence of the military's activities are left behind (the chemical light devices) and will persist for decades or longer. Depending on where the military exercise occurs, this may not be allowed (example: USA or Europe). Military personnel are required in these areas to attempt to collect all consumed chemical light devices.

Commercial fishermen utilizing long lines to catch swordfish and some species of tuna use chemical light devices as lures or attractants. The long lines are significant in length (often miles long) and deploy thousands of hooks pendent from the long line. A chemical light device is typically attached over each hook. Therefore, thousands of chemical light devices are deployed with each long line. This style of fishing typically occurs at night, with the line deployed in late afternoon or early evening and retrieved the next morning. The commercial fishermen are encouraged to disconnect the chemical light devices and to return them to shore for proper disposal. All will disconnect the chemical light devices, but many do not return them to shore for disposal. Instead, they throw the chemical light devices overboard into the oceans. This has created a significant problem on beaches in many parts of the world, with literally thousands of plastic chemical light devices washing up onto a beach with the tides and currents.

If it were possible to provide a chemiluminescent product and chemical system which was inherently biodegradable in its environment of use, such that said device, inclusive of the chemiluminescent components, could re-enter the environment within a reasonable interval after its usefulness was at an end, then a long-felt need in the art would be satisfied.

DESCRIPTION OF THE PRIOR ART

U.S. Pat. No. 5,409,751 is directed toward a degradable container formed from polylactic acid(s) alone or in combination with other hydroxycarboxylic acids.

U.S. Pat. No. 5,759,569 teaches a biodegradable article manufactured from trans polymers, e.g. trans-1,4-polyisoprene, optionally blended with other biodegradable components, e.g. starch.

U.S. Pat. No. 5,346,929 discloses a biodegradable plastic including a synthetic polymer, a natural polymer and a polymer attacking agent, and articles made therefrom.

U.S. Pat. No. 5,760,118 is directed towards end uses of biodegradable polymers, e.g. their end-use in frequently littered products such as drink containers, construction materials and the like.

While the art demonstrates that biodegradable polymer containers are known, per se, the references nevertheless fail to teach or suggest a biodegradable chemiluminescent device, wherein the container and possibly the chemiluminescent agents are all readily biodegradable.

SUMMARY OF THE INVENTION

Chemiluminescent articles and methods for their production and use have now been developed which yield chemical light devices that do not create a waste or waste disposal problem. These new devices are exemplified in two major forms with certain variations:

1. Devices that disintegrate but do not biodegrade
2. Devices that disintegrate and substantially biodegrade.

With reference to materials useful as containment devices in the present invention, the following definitions are relied upon:

"Disintegrates" is defined as a material which self disintegrates so as to lose its physical form;

"Biodegradable" is defined as a material whose component parts reenter the food chain within a reasonable period of time;

"Reentering the food chain" means that the component can be utilized as a raw material (food) by either plants or bacteria.

Unlike "normal" plastics, which degrade very slowly, degradable plastics are manufactured so as to exhibit an accelerated rate of decomposition. This acceleration is accomplished by either adding an additional component which degrades easily, or by reducing the inherent non-degradable characteristics of the particular plastic material. Plastics that disintegrate into small parts have been developed and marketed for years and are called biodegradable. Starch/polyolefin yard waste bags are an example of this technology. These bags disintegrate (lose coherent form) when they become wet (the starch dissolves in water and frees the bound polyolefin that gave the bag its physical strength and other characteristics). This technology does eliminate the disposal problem of the bag (which could present a hazard to small children and/or animals) by allowing the bag to lose its form. However, a significant part of the bag (the polyolefin) does not actually re-enter the food-chain. Therefore, by the above definition, these bags are not truly biodegradable. Photodegradable (UV degradable) polymers are another example of plastic materials that disintegrate into smaller parts but may not completely re-enter the food chain. Examples of this technology are polymers formed by inserting into the polymer chain irregularities that are subject to degradation by UV light. Illustrative of these irregularities are carbonyl groups (ketone carbonyl copolymers or carbon monoxide copolymers) or metal salts. Significant questions remain regarding the extent of degradation of most photodegradable plastics, i.e. do these degrade into non-plastic products or do they simply disintegrate into smaller pieces of plastic.

True biodegradable plastics do exist. These materials are consumed by microorganisms such as bacteria, fungi, or algae. The microorganisms break down the polymer chain and consume the material through several methods. The polymers can be either hydrolysable or water soluble. Some common biodegradable plastics are polyesters, polyhydroxybutyrates, and vinyl polymers. Examples of biodegradable polymers are listed in Table 1.

TABLE 1

| Plastic Type | Name | Abbreviation | Description |
|---|---|---|---|
| Polyesters | Polyglycolic Acid | PGA | Hydrolyzable polyhydroxy acid |
| | Polyactic Acid | PLA | Hydrolyzable polyhydroxy acid;polymers derived from fermenting crops and dairy products; compostable |
| | Polycaprolactone | PCL | Hydrolyzable; low softening and melting points; compostable; long time to degrade |

TABLE 1-continued

| Plastic Type | Name | Abbreviation | Description |
|---|---|---|---|
| Polyhydroxy butyrates | Polyhydroxybutyrate | PHB | Hydrolyzable; produced as storage material by microorganisms; possibly degrades in aerobic and anaerobic conditions; stiff; brittle; poor solvent resistance |
| | Polyhydroxyvalerate | PHBV | Hydrolyzable copolymer; processed similar to PHB; contains a substance to increase degradability, melting point, and toughness |
| Vinyl | Polyvinyl Alcohol | PVOH | Water soluble; dissolves during composting |
| | Polyvinyl Acetate | PVAC | Water soluble; predecessor to PVOH |
| | Polyetherketone | PEK | Water soluble; derived from PVOH; possibly degrades in aerobic and anaerobic conditions |

Chemical light devices have now been produced which, dependent upon the materials of construction, either disintegrate (like the yard waste bag example above) or truly disintegrate and biodegrade.

In a particularly preferred embodiment, a device is provided which has the ability to both disintegrate and completely biodegrade. This embodiment incorporates an entirely new solvent/materials of construction system from that which has been previously suggested or disclosed in the prior art.

Generally, chemiluminescent light is produced by the reaction of a catalyzed hydrogen peroxide solution with an oxalate solution. The main component of the oxalate solution is usually bis(6-carbopentoxy-2,4,5-trichlorophenyl)oxalate (CPPO) which is mixed with dibutyl phthalate and a fluorescent dye (e.g., 9,10 bis (phenylethynyl) anthracene) (BPEA). The hydrogen peroxide solution ("activator") typically includes a major portion of hydrogen peroxide, tertiary butanol, dimethyl phthalate and a catalyst (e.g., salicylate of sodium or other metal).

This new biodegradable chemical light system includes the following:
1. A liquid carrier capable of solubilizing the oxalate ester and the fluorescer;
2. A liquid carrier capable of solubilizing the hydrogen peroxide and catalyst;
    wherein both liquids must be biodegradable; and
3. A plastic that is formable, flexible and biodegradable wherein said plastic is compatible with both the liquids and the chemical light active ingredients.

Accordingly, it is an objective of the instant invention to provide an article of manufacture, in the form of a chemiluminescent light producing device, which is completely biodegradable.

It is another objective of the instant invention to provide a container for retaining a chemiluminescent chemical light system which is completely biodegradable.

It is a further objective of the instant invention to provide a container for retaining a chemiluminescent chemical light system which disintegrates but does not biodegrade.

It is yet another objective of the instant invention to provide a container for retaining a chemiluminescent chemical light system which disntegrates and substantially biodegrades.

It is a still further objective of the instant invention to provide a methodology for selecting/formulating the constituents of a chemiluminescent chemical light system which is biodegradable, and any chemiluminescent chemical light system produced thereby.

Other objects and advantages of this invention will become apparent from the following description, wherein are set forth, by way of illustration and example, certain embodiments of this invention.

DETAILED DESCRIPTION OF THE INVENTION

The present invention includes chemiluminescent light producing devices, e.g. light sticks, wherein their materials of construction enable them to be characterized as being particularly susceptible to environmental degradation, and which may be categorized as follows:

| CONTAINER PROPERTIES | CHEMICAL SYSTEM PROPERTIES |
|---|---|
| Disintegrates/does not Biodegrade | Standard Chemical System/ Biodegradable Chemical System |
| Disintegrates/Partially Biodegrades | Standard Chemical System/ Biodegradable Chemical System |
| Disintegrates and Biodegrades | Standard Chemical System/ Biodegradable Chemical System |

These systems are more properly illustrated by the following examples:

EXAMPLE 1

Device that Disintegrates but does not Biodegrade

Extrude into a tubular form a starch/polyolefin combination. Heat seal one end and fill with a typical chemical light oxalate solution (91.6% deputy phthalate, 8.4% CPPO, 0.19% BPEA). Float within the oxalate solution a sealed glass vial containing a typical chemical light activator solution (85% dimethyl phthalate, 10% t-butanol, 5% of 70% concentration hydrogen peroxide, 0.0085% sodium salicylate). Heat seal the remaining end. Flex to break the glass vial and light will result. Drop the device into water and it will soften and then dissolve. However, the polyolefin will remain and be unaffected over a long period of time (decades). Additionally, although not environmentally hazardous in small quantities, e.g. that found in a lightstick, the solvents, if released in large quantities may present environmental and toxicological problems as known marine pollutants (dibutyl phthalate) and possible endocrine disruptors (dimethyl phthalate). Neither has a particularly high bioavailability.

EXAMPLE 2

Device that Disintegrates and Partially Biodegrades

Extrude into a tubular form a polyvinyl alcohol/polyvinyl acetate combination. Heat seal one end and fill with a typical chemical light oxalate solution (91.6% dibutyl phthalate, 8.4% CPPO, 0.19% BPEA). Float within the oxalate solution a sealed glass vial containing a typical chemical light activator solution (85% dimethyl phthalate, 10% t-butanol, 5% of 70% concentration hydrogen peroxide, 0.0085% sodium salicylate). Heat seal the remaining end. Flex to break the glass vial and light will result. Drop the device into water and it will soften and then dissolve. With the addition of normal soil bacteria, the polyvinyl alcohol/polyvinyl acetate combination will be consumed (this PVA combination has the same bioavailability as cellulose in the normal environment). Although not environmentally hazardous in small quantities, e.g. that found in a lightstick, the solvents, if released in large quantities may present environmental and toxicological problems as known marine pollutants (dibutyl phthalate) and possible endocrine disruptors (dimethyl phthalate). Neither has a particularly high bioavailability.

EXAMPLE 3

Device that Disintegrates and Partially Biodegrades

Extrude into thin sheet form a ketone carbonyl copolymer (vinyl ketone comonomer inserted into polyethylene). Thermoform it into a shallow cup with a lip. Drop into the cup a non-woven polyester felt pad or sheet and two sealed glass vials, one containing a typical oxalate component (91.6% dibutyl phthalate, 8.4% CPPO, 0.19% BPEA) and the other containing a typical activator component (85% dimethyl phthalate, 10% t-butanol, 5% of 70% concentration hydrogen peroxide, 0.0085% sodium salicylate). Heat seal a flat sheet of the ketone carbonyl copolymer onto the cup lip, forming a sealed container with the felt sheet and vials. Flex the entire unit, breaking the glass vials and allowing the liquids to mix and soak into the felt, creating light. Leave the light device outside where is can and will be exposed to sunlight (and in particular, UV light). The plastic container will degrade and disintegrate. It may reenter the food chain in a reasonable length of time. The felt sheet and the solvents released will not degrade quickly and present possible environmental and toxicological problems.

EXAMPLE 4

Device that Disintegrates and Biodegrades

Injection mold a tube and cap combination from a polyvinyl alcohol/polyvinyl acetate combination. Contain within (prior to sealing the tube and cap together) an oxalate component made with 8.4% CPPO, 0.19% BPEA, and 91.41% of a 50/50 mixture of propylene glycol dibenzoate and acetyltributyl citrate. Float within this oxalate component a sealed glass vial containing 85% triethyl citrate, 10% t-butanol, 5% of 70% concentration hydrogen peroxide, and 0.0085% sodium salicylate. Seal the cap and tube together and flex to break the glass vial and allow mixing of the liquids. Light will result. The expired device may be buried in the ground (typical landfill disposal) or alternatively disposed of at sea, or the like. Naturally occurring bacteria will consume the polymer and the solvent combinations in a reasonable period of time (both the polymer and solvents have a bioavalability similar to cellulose).

Biodegradable chemiluminescent chemical light systems are selected in accordance with the following criteria:

Oxalate Solvent Selection Rules:

1. Select a general set of parameters or limiters that you wish or need to meet, i.e. a particular biodegradable characteristic such as comprising a biodegradable solvent with a bioavailability close to that of cellulose.

2. Select a class of solvents that meets the parameters set forth in Number 1.

3. Find members of this class of solvents that contain a carboxy-phenyl group:

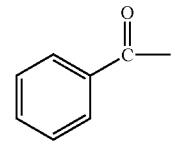

Solvents containing at least one carboxy-phenyl group within their structure can and will solvate the active chemical light ingredients (CPPO and fluorescers). Group the members in order of water miscibility so as to optimize the degree of CPPO solubility.

4. If the class of solvents does not contain any members with a carboxy-phenyl group but is still the best candidate to satisfy the parameters set forth in Number 1, then choose a second class of solvents that comes close to meeting the requirements of Number 1, is miscible in the class of solvents chosen in Number 3, has at least one member with a carboxy-phenyl group, and rank via water miscibility.

5. Make mixtures of the solvents chosen in Steps 3 and 4 with varying concentrations of each solvent. Blend into them different levels of CPPO and the individual fluorescers. CPPO solubility DECREASES with decreasing concentration of the solvent chosen in Step 4. The solvent chosen in Step 4 was deliberately chosen to optimize the degree of CPPO solubility of members of that group. The optimum combination of solvents, CPPO, and fluorescer will have to be determined empirically due to the differing absorption of the different colors of light by different solvents (a solvent that absorbs in the blue region of the spectrum will require a higher concentration of CPPO and blue fluorescer than a solvent that absorbs in the red end of the spectrum).

Activator Solvent Selection Rules:

1. Return to the class of solvents chosen in Step 2 of the Oxalate Selection Rules.

2. From this class of solvents, find all members that have a miscibility in water effective to stabilize the peroxide component of the chemical light activator system.

3. If no members of the class of solvents chosen in Step 2 of the Oxalate Selection Rules has a miscibility in to effectively stabilize the peroxide component, then choose a second class of solvents that comes close to meeting the requirements of Number 1 from the Oxalate Selection Rules, is miscible in the class of solvents chosen in Number 2 of the Oxalate Selection Rules, and has member(s) that effectively stabilize the peroxide component.

4. Make mixtures of the solvents chosen in Steps 2 and 3 with varying concentrations of each solvent. Choose the blend that contains the highest concentration of the desired solvent (that chosen in Step 2 of the Oxalate Selection Rules) AND effectively stabilizes the peroxide component.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A chemiluminescent light producing device comprising a biodegradable polymeric composition, said biodegradable polymeric composition forming an outer containment device enclosing at least one inner frangible vial, said outer containment device and said vial containing a chemical system, said outer containment device and said vial each containing one of an oxalate component and a peroxide component of said chemical system, separately, said oxalate component and said peroxide component producing visible light when intermixed in said polymeric outer containment device, said oxalate component comprising a 50/50 mixture of propylene glycol dibenzoate and acetyltributyl citrate;
wherein said biodegradable polymeric composition comprises at least one polymeric material selected from the group consisting of polyglycolic acid, polyactic acid, polycaprolactone, polyhydroxybutyrate, polyhydroxyvalerate, polyvinyl alcohol, polyvinyl acetate, and polyetherketone.

2. The chemiluminescent light producing device in accordance with claim 1 wherein: said chemical system retained therein is biodegradable.

3. The chemiluminescent light producing device of claim 1 wherein said chemical system comprises approximately 8.4% CPPO, 0.19% BPEA and 91.41% of a 50/50% mixture of propylene glycol dibenzoate and acetyltributyl citrate in said oxalate component and a mixture of approximately 85% triethyl citrate, 10% tbutanol, 5% of a 70% concentration hydrogen peroxide, and 0.0085% sodium salicylate in said peroxide component.

4. A process for selecting a biodegradable chemiluminescent light producing system including a chemical light oxalate system and a chemical light activator system comprising:
first selecting an oxalate solvent in accordance with the following criteria;
select a general set of solvent parameters required to impart particular biodegradable characteristics;
select a class of solvents that meet said parameters;
specify members of said class of solvents that contain a carboxy-phenyl group:

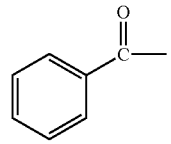

group the members in order of water miscibility;
select the member of said group that will optimize the solubility of active chemical light ingredients;
wherein a 50/50 mixture of propylene plycol dibenzoate and acetyltributyl citrate is selected as said oxalate solvent;
produce blends having different combinations of said active chemical light ingredients;
optimize said combination of solvents and active chemical light ingredients empirically as a function of differing absorption of different colors of light by different solvents;
secondly, select an activator solvent in accordance with the following criteria;
return to the class of solvents chosen above;
from this class of solvents, find all members that have a miscibility in water effective to stabilize a peroxide component of said chemical light activator system; and
blend activator components in said solvent having a miscibility effective to stabilize said peroxide component;
whereby visible light is emitted from said oxalate system and said peroxide system upon admixture and said admixture being consumable by natural bacteria such that a biodegradable chemiluminescent light producing system is defined.

5. A chemiluminescent light producing device comprising a polymeric composition that disintegrates so as to lose its physical form, said polymeric composition forming an outer containment device enclosing at least one inner frangible vial, said outer containment device and said vial containing a chemical system, said outer containment device and said vial each containing one of an oxalate component and a peroxide component of said chemical system, separately, said oxalate component and said peroxide component producing visible light when intermixed in said polymeric outer containment device, said oxalate component comprising a 50/50 mixture of propylene glycol dibenzoate and acetyltributyl citrate;
wherein said polymeric composition comprises a starch/polyolefin combination whereby said polymeric composition is capable of disintegrating.

6. The chemiluminescent light producing device in accordance with claim 5 wherein: said chemical system retained therein is biodegradable.

7. The chemiluminescent light producing device of claim 5 wherein said chemical system comprises approximately 8.4% CPPO, 0.19% BPEA and 91.41% of a 50/50% mixture of propylene glycol dibenzoate and acetyltributyl citrate in said oxalate component and a mixture of approximately 85% triethyl citrate, 10% t-butanol, 5% of a 70% concentration hydrogen peroxide, and 0.0085% sodium salicylate in said peroxide component.

8. A chemiluminescent light producing device comprising a polymeric composition that is photodegradable so as to lose its physical form, said polymeric composition forming an outer containment device enclosing at least one inner frangible vial, said outer containment device and said vial containing a chemical system, said outer containment device and said vial each containing one of an oxalate component and a peroxide component of said chemical system, separately, said oxalate component and said peroxide component producing visible light when intermixed in said polymeric outer containment device, said oxalate component comprising a 50/50 mixture of propylene glycol dibenzoate and acetyltributyl citrate;

wherein said polymeric composition comprises photodegradable polymers that include UV sensitive components, whereby said ultraviolet (UV) sensitive components photodegrade when subjected to ultraviolet (UV) light.

9. The chemiluminescent light producing device in accordance with claim 8 wherein: said chemical system retained therein is biodegradable.

10. The chemiluminescent light producing device of claim 8 wherein said chemical, system comprises approximately 8.4% CPPO, 0.19% BPEA and 91.41% of a 50/50% mixture of propylene glycol dibenzoate and acetyltributyl citrate in said oxalate component and a mixture of approximately 85% triethyl citrate, 10% t-butanol, 5% of a 70% concentration hydrogen peroxide, and 0.0085% sodium salicylate in said peroxide component.

11. The chemiluminescent light producing device of claim 8 wherein said UV sensitive components include one member selected from the group consisting of ketone carbonyl copolymers, carbon monoxide copolymers or metal salts.

* * * * *